United States Patent Office 3,375,065
Patented Mar. 26, 1968

3,375,065
METHOD OF CATION EXCHANGING
SYNTHETIC FAUJASITE
Carl V. McDaniel, Laurel, and Philip K. Maher, Baltimore, Md., assignors to W. R. Grace & Co., New York, N.Y., a corporation of Delaware
No Drawing. Continuation-in-part of applications Ser. No. 318,249, Oct. 23, 1963, and Ser. No. 367,864, May 15, 1964. This application Jan. 25, 1965, Ser. No. 427,967
1 Claim. (Cl. 23—112)

ABSTRACT OF THE DISCLOSURE

Method of cation exchanging crystalline zeolite aluminosilicates to reduce the sodium content, expressed as the oxide, of the zeolite to less than 1%. The process is characterized by a primary sequence comprising a cation exchange step followed by a heat treatment step followed by another cation exchange step. The sequence is applied either singly or multiply, depending upon the particular materials, temperatures, cation exchange solution concentrations, etc., used. In a further embodiment the second cation exchange solution contains desirable metal cations, such as rare earths.

This application is a continuation-in-part of application Ser. No. 318,249, filed Oct. 23, 1963 and now abandoned, and application Ser. No. 367,864, filed May 15, 1964.

This invention relates to an improved method for replacing exchangeable cations in zeolitic materials with other exchangeable cations. In particular this invention relates to cation exchange processes for replacing cations in zeolitic materials such as synthetic faujasites, for example, with greater exchange efficiency, to cation exchange processes for making synthetic faujasites having a greater thermal stability, and to the thermally stable synthetic faujasite compositions produced thereby.

In summary, the process of this invention is a method of cation exchange of crystalline zeolitic materials comprising the steps of contacting the zeolite with a solution containing exchangeable cations, separating the zeolite from the solution and heating up to a temperature above 350° F. but which is insufficient to cause significant changes in the crystal structure of the zeolite, and contacting the zeolite with a solution containing exchangeable cations, whereby substitution of exchangeable cations in the zeolite is greatly facilitated.

In summary, the process of this invention for producing a synthetic faujasite having an improved thermal stability comprises contacting an ammonium cation exchanged synthetic fajasite containing less than one weight percent alkali metal cations, expressed as the oxide, with an aqueous solution containing stabilizing cations selected from the group consisting of magnesium, rare earths, and mixtures thereof, and recovering the thermally stable faujasite product.

In summary, the composition of this invention comprises ammonium cation exchanged synthetic faujasite having a silica to alumina ratio within the range of from 3.5 to 7, an alkali metal cation content expressed as the oxide of less than one weight percent, and a rare earth cation content expressed as the oxide of from 5 to 25 weight percent.

One particular preferred embodiment of the process of this invention which employs the improved ion exchange technique comprises the formulation of a thermally stable synthetic faujasite and includes the steps of contacting the faujasite with an anqueous solution containing ammonium ions, separating the ammonium exchanged faujasite from the solution, heating the faujasite up to a temperature above 350° F. but which is insufficient to cause significant changes in the crystal structure of the zeolite, contacting the faujasite with an aqueous solution containing ammonium ions, and contacting the faujasite with an aqueous solution containing exchangeable stabilizing cations selected from the group consisting of magnesium, rare earth cations, and mixtures thereof, whereby a thermally stable faujasite is formed.

Substitution of exchangeable cations in crystalline zeolites is often necessary in order to obtain zeolites which are particularly suitable for specialized commercial uses. Replacement of cations with other cations to vary the pore size of crystalline zeolites in order to separate molecules by selective adsorption with the zeolites is often found to be desirable. In addition, removal of objectionable cations, and the replacement thereof with beneficial cations is usually required to produce active, selective, and thermally stable hydrocarbon conversion catalysts from zeolites as they are found in nature or synthesized.

Prior to the method of this invention, base exchange of zeolites was a lengthy, expensive process. In order to obtain replacement of a major proportion of a cation in a zeolite with another cation, the exchange sequence, comprising solution and separation of the zeolite therefrom, had to be repeated many times. Typical examples of the magnitude of this technical difficulty are illustrated in the summary Table VII of U.S. Patent No. 3,140,249. Example 16 of that table shows that eight separate exchanges were required to lower the sodium level to 1.09 weight percent by exchange with an ammonium chloride solution. Other examples in the tables with other cations show the necessity for many separate exchanges to obtain replacement of a major proportion of the exchangeable cations in the zeolite with other cations.

It is one object of this invention to provide an improved method for replacement of exchangeable cations in zeolites with other cations by base exchange whereby the number of exchanges required is greatly diminished.

It is another object of this invention to provide a method for producing a thermally stable zeolite by base exchange techniques and the product of this process.

A principal feature of the process of this invention comprises thermally treating crystalline zeolites between base exchange operations.

Any crystalline zeolite having cations which can be replaced by base exchange techniques can be employed in the process of this invention. Examples of suitable synthetic zeolites are shown in Table A.

TABLE A

| Zeolite | Oxide Mole Ratios (shown as alkali metal oxide form) | Patent Disclosure |
|---|---|---|
| Zeolite X | $1.0\pm0.2$ $Na_2O:Al_2O_3:2.5\pm0.5$ $SiO_2:0-8$ $H_2O$ | U.S. 2,882,244. |
| Zeolite Y | $0.9\pm0.2$ $Na_2O:Al_2O_3:3-6$ $SiO_2:0-9$ $H_2O$ | U.S. 3,130,007. |
| Zeolite A | $1.0\pm0.2$ $Na_2O:Al_2O_3:1.85\pm0.5$ $SiO_2:0-6$ $H_2O$ | U.S. 2,882,243. |
| Zeolite L | $1.0\pm0.1$ $Na_2O:Al_2O_3:6.4\pm0.5$ $SiO_2:0-7$ $H_2O$ | Bel. 575,117. |
| Zeolite D | $0.9\pm0.2$ $[(0-1)$ $Na_2O:(1-0)$ $K_2O]:Al_2O_3:4.5-4.9$ $SiO_2:0-7$ $H_2O$ | Can. 611,981. |
| Zeolite R | $0.9\pm0.2$ $Na_2O:Al_2O_3:2.45-3.65$ $SiO_2:0-7$ $H_2O$ | U.S. 3,030,181. |
| Zeolite S | $0.9\pm0.2$ $Na_2O:Al_2O_3:4.6-5.9$ $SiO_2:0-7$ $H_2O$ | U.S. 3,054,657. |
| Zeolite T | $1.1\pm0.4$ $[(0.1-0.8)$ $Na_2O:(0.9-0.2)$ $K_2O]:Al_2O_3:6.9\pm0.5$ $SiO_2:0-8$ $H_2O$ | U.S. 2,950,952. |
| Zeolite Z | $K_2O:Al_2O_3:2$ $SiO_2:0-3$ $H_2O$ | Can. 614,995. |
| Zeolite E | $0.9\pm0.1$ $Na_2O:Al_2O_3:1.95\pm0.1$ $SiO_2:0-4$ $H_2O$ | Can. 636,931. |
| Zeolite F | $0.95\pm0.15$ $Na_2O:Al_2O_3:2.05\pm0.3$ $SiO_2:0-3$ $H_2O$ | U.S. 2,996,358. |
| Zeolite O | $0.95\pm0.05$ $Na_2O:Al_2O_3:12.2\pm0.05$ $SiO_2:0-5$ $H_2O$ | U.S. 3,140,252. |
| Zeolite B | $1.0\pm0.2$ $Na_2O:Al_2O_3:3.5\pm1.5$ $SiO_2:0-6$ $H_2O$ | U.S. 3,008,803. |
| Zeolite Q | $0.95\pm0.05$ $Na_2O:Al_2O_3:2.2\pm0.05$ $SiO_2:XH_2O$ | U.S. 2,991,151. |
| Zeolite M | $1.0\pm0.1$ $K_2O:Al_2O_3:2.0\pm0.1$ $SiO_2:XH_2O$ | U.S. 2,995,423. |
| Zeolite H | $1.0\pm0.1$ $Na_2O:Al_2O_3:2.0\pm0.1$ $SiO_2:XH_2O$ | U.S. 3,010,789. |
| Zeolite J | $0.9\pm0.1$ $K_2O:Al_2O_3:2.1\pm0.2$ $SiO_2:XH_2O$ | U.S. 3,011,869. |
| Zeolite W | $1.0\pm0.1$ $Na_2O:Al_2O_3:4.1\pm0.8$ $SiO_2:YH_2O$ | U.S. 3,012,853. |
| Zeolite KG | $0.9-1.1$ $Na_2O:Al_2O_3:2.3-4.2$ $SiO_2:2.6-4.6$ $H_2O$ | U.S. 3,056,654. |

Among the naturally occurring crystalline aluminosilicates which can be employed in the process of this invention are included levynite, dachiardite, erionite, faujasite, analcite, paulingite, noselite, ferriorite, heulandite, scolecite, stibite, clinoptilolite, harmotome, phillipsite, brewsterite, flakite, datolite, and aluminosilicates represented as follows:

Chabazite, $Na_2O.Al_2O_3.4SiO_2.6H_2O$
Gmelinite, $Na_2O.Al_2O_3.4SiO_2.6H_2O$
Cancrimte, $3(Na_2O.Al_2O_3.2SiO_2).Na_2CO_3$
Leucite, $K_2O.Al_2O_3.4SiO_2$
Lazurite, $(Na, Ca)_8Al_6Si_6O_2$ $4.2(S, Cl, SO_4)$
Scaplite, $Na_4Al_3Si_9O_{24}.Cl$
Mesolite, $Na_2O.Al_2O_3.3SiO_2.2-3H_2O$
Ptilolite, $Na_2O.Al_2O_3.10SiO_2.4H_2O$
Mordenite, $Na_2O.Al_2O_3.10SiO_2.6.6H_2O$
Nepheline, $Na_2O.Al_2O_3.2SiO_2$
Natrolite, $Na_2O.Al_2O_3.3SiO_2.2H_2O$
Sodalite, $3(Na_2O.Al_2O_3.2SiO_2).2NaCl$ Certain embodiments of the process of this invention relate to thermally stable "synthetic faujasites." "Synthetic faujasites" are defined as including both "Type X" and "Type Y" zeolites, examples of which are disclosed in U.S. Patent Nos. 2,882,244 and 3,130,007, respectively.

The cations which can be employed in the process of this invention include hydrogen, exchangeable cations which decompose on heating to provide hydrogen ions, and metals in Groups I-A through VIII of the Periodic Table. A wide variety of acidic compounds can be employed with facility as a source of hydrogen ions and include both inorganic and organic acids. The acid concentration in the exchange solution can vary over a wide range, not being sufficient to destroy the crystalline structure of the particular zeolite employed. The pH ranges suitable vary from zeolite to zeolite. For example, the pH of the exchange solution should be above 4 when the zeolite contacted therewith is faujasite. Other zeolites such as mordenite can tolerate an even lower solution pH.

Representative inorganic acids which can be employed include acids such as hydrochloric acid, hypochlorous acid, chloroplatinic acid, sulfuric acid, sulfurous acid, hydrosulfuric acid, peroxydisulfonic acid ($H_2S_2O_3$), peroxymonosulfuric acid ($H_2SO_5$), dithionic acid ($H_2S_2O_6$), sulfamic acid ($H_2NHS_3H$), amidodisulfonic acid ($NH(SO_3H)_2$), chlorosulfuric acid, thiocyanic acid, hyposulfurous acid ($H_2S_2O_4$), pyrosulfuric acid ($H_2S_2O_7$)

thiosulfuric acid ($H_2S_2O_3$), nitrosulfonic acid ($HSO_2.NO$)

hydroxylamine disulfonic acid (($HSO_3)_2NOH$), nitric acid, nitrous acid, hyponitrous acid, carbonic acid and the like.

Typical organic acids which find utility in the practice of the invention include the monocarboxylic, dicarboxylic and polycarboxylic acids which can be aliphatic, aromatic or cycloaliphatic in nature.

Representative aliphatic monocarboxylic, dicarboxylic and polycarboxylic acids include the saturated and unsaturated, substituted and unsubstituted acids such as formic acid, acetic acid, chloroacetic acid, dichloroacetic acid, trichloroacetic acids, bromoacetic acid, propionic acid, 2-bromopropionic acid, 3-bromopropionic acid, lactic acid, n-butyric acid, and isobutyric acid, crotonic acid, n-valeric acid, isovaleric acid, n-caproic acid, cenanthic acid, pelargonic acid, capric acid, undecylic acid, lauric acid, myristic acid, palmitic acid, stearic acid, oxalic acid, malonic acid, succinic acid, glutaric acid, adipic acid, pimelic acid, suberic acid, azelaic acid, sebacic acid, alkyl-succinic acid, alkenylsuccinic acid, maleic acid, fumaric acid, itaconic acid, citraconic acid, mesaconic acid, glutonic acid, muconic acid, ethylidene malonic acid, isopropylidene malonic acid, allyl malonic acid.

Representative aromatic and cycloaliphatic moncarboxylic, dicarboxylic and polycarboxylic acids include 1,2-cyclohexanedicarboxylic acid, 1,4-cyclohexanedicarboxylic acid, 2-carboxy-2-methylcyclohexaneacetic acid, phthalic acid, isophthalic acid, terephthalic acid, 1,8-naphthalenedicarboxylic acid, 1,2 - naphthalenedicarboxylic acid, tetrahydrophthalic acid, 3 - carboxycinnamic acid, hydrocinnamic acid, pyrogallic acid, benzoic acid, ortho-, meta- and paramethyl, hydroxy, chloro, bromo and nitrosubstituted benzoic acids, phenylacetic acid, mandelic acid, benzylic acid, hippuric acid, benzenesulfonic acid, toluenesulfonic acid, methanesulfonic acid and the like.

Other sources of hydrogen ions include carboxy polyesters prepared by the reaction of an excess polycarboxylic acid or and anhydride thereof and a polyhydric alcohol to provide pendant carboxyl groups.

Still other materials capable of providing hydrogen ions are ion exchange resins having exchangeable hydrogen ions attached to base resins comprising cross-linked resinous polymers of monovinyl aromatic monomers and polyvinyl compounds. These resins are well known materials which are generally prepared by co-polymerizing in the presence of a polymerization catalyst one or more monovinyl aromatic compounds, such as styrene, vinyl toluene, vinyl xylene, with one or more divinyl aromatic compounds such as divinyl benzene, divinyl toluene, divinyl xylene, divinyl naphthalene and divinyl acetylene. Following copolymerization, the resins are further treated with suitable acids to provide the hydrogen form of the resin.

Still another class of compounds which can be employed are ammonium compounds which decompose to provide hydrogen ions when an aluminosilicate treated with a solution of said ammonium compound is subjected to temperatures below the decomposition temperature of the aluminosilicate.

Representative ammonium compounds which can be employed include ammonium chloride, ammonium bromide, ammonium iodide, ammonium carbonate, ammonium bicarbonate, ammonium sulfate, ammonium sulfide, ammonium thiocyanate, ammonium dithiocarbamate, ammonium peroxysulfate, ammonium acetate, ammonium tungstate, ammonium hydroxide, ammonium molybdate, ammonium benzoate, ammonium borate, ammonium carbamate, ammonium sesquicarbonate, ammonium chloroplumbate, ammonium citrate, ammonium dithionate, ammonium fluoride, ammonium gallate, ammonium nitrate, ammonium nitrite, ammonium formate, ammonium propionate, ammonium butyrate, ammonium valerate, ammonium lactate, ammonium malonate, ammonium oxalate, ammonium palmitate, ammonium tartrate and the like. Still other ammonium compounds which can be employed include tetraalkyl and tetraaryl ammonium salts such as tetramethylammonium hydroxide, trimethylammonium hydroxide. Other compounds which can be employed are nitrogen bases such as the salts of guanidine, pyridine, quinoline, etc.

A wide variety of metallic compounds can be employed with facility as a source of metallic cations and include both inorganic and organic salts of the exchangeable metals of Group I–A through Group VIII of the Periodic Table.

Representative of the salts which can be employed include chlorides, bromides, iodides, carbonates, bicarbonates, sulfates, sulfides, thiocyanates, dithiocarbamates, peroxysulfates, acetates, benzoates, citrates, fluorides, nitrates, nitrites, formates, propionates, butyrates, valerates, lactates, malonates, oxalates, palmitates, hydroxides, tartrates and the like. The only limitations on the particular metal salt or salts employed are that it be soluble in the fluid medium in which it is used. The preferred salts are the chlorides, nitrates, acetates and sulfates.

Of particular interest are stabilizing cations, i.e., cations whose presence in the zeolite tends to increase the thermal stability of the zeolite. These ions include magnesium and the rare earths. Salts of rare earth metals including cerium, lanthanum, praseodymium, neodymium, illinium, samarium, europium, gadolinium, terbium, dysprosium, holmium, erbium, thulium, yttrium, ytterbium and lutecium may be employed.

The rare earth salts employed can either be the salt of a single metal or preferably, of mixtures of metals such as a rare earth chloride or didymium chlorides. As hereinafter referred to, a rare earth chloride solution is a mixture of rare earth chlorides consisting essentially of the chlorides of lanthanum, cerium, neodymium and praseodymium with minor amounts of samarium, gadolinium and yttrium. The rare earth chloride solution is commercially available and it contains the chlorides of a rare earth mixture having the relative composition cerium (as $CeO_2$) 48 percent by weight, lanthanum (as $La_2O_3$) 24 percent by weight, praseodymium (as $Pr_6O_{11}$) 5 percent by weight, neodymium (as $Nd_2O_3$) 17 percent by weight, samarium (as $Sm_2O_3$) 3 percent by weight, gadolinium (as $Gd_2O_3$) 2 percent by weight, yttrium (as $Y_2O_3$) 0.2 percent by weight and other rare earth oxides 0.8 percent by weight. Didymium chloride is also a mixture of rare earth chlorides, but having a low cerium content. It consists of the following rare earths determined as oxides: lanthanum, 45–46 percent by weight; cerium 1–2 percent by weight; praseodymium, 9–10 percent by weight; neodymium, 32–33 percent by weight; samarium, 5–6 percent by weight; gadolinium 3–4 percent by weight; yttrium 0.4 percent by weight; other rare earths 1–2 percent by weight. It is to be understood that other mixtures of rare earths are equally applicable in the instant invention.

Representative metal salts which can be employed, aside from the mixtures mentioned above, include silver sulfate, silver nitrate, silver acetate, silver arsenate, silver citrate, silver carbonate, silver oxide, silver tartrate, calcium acetate, calcium arsenate, calcium benzoate, calcium bromide, calcium carbonate, calcium chloride, calcium citrate, beryllium bromide, beryllium carbonate, beryllium hydroxide, beryllium sulfate, barium acetate, barium bromide, barium carbonate, barium citrate, barium malonate, barium nitrite, barium oxide, barium sulfide, lithium chloride, sodium chloride, sodium sulfate, sodium nitrate, potassium chloride, potassium sulfate, potassium nitrate, magnesium chloride, magnesium bromide, magnesium sulfate, magnesium sulfide, magnesium acetate, magnesium formate, magnesium stearate, magnesium tartrate, zinc sulfate, zinc nitrate, zinc acetate, zinc chloride, zinc bromide, aluminum chloride, aluminum bromide, aluminum acetate, aluminum citrate, aluminum nitrate, aluminum oxide, aluminum phosphate, aluminum sulfate, titanium bromide, titanium chloride, titanium nitrate, titanium sulfate, zirconium chloride, zirconium nitrate, zirconium sulfate, chromic acetate, chromic chloride, chromic nitrate, chromic sulfate, ferric chloride, ferric bromide, ferric acetate, ferrous chloride, ferrous arsenate, ferrous lactate, ferrous sulfate, nickel chloride, nickel bromide, cerous acetate, cerous bromide, cerous carbonate, cerous chloride, cerous iodide, cerous sulfate, cerous sulfide, lanthanum chloride, lanthanum bromide, lanthanum nitrate, lanthanum sulfate, lanthanum sulfide, yttrium bromate, yttrium bromide, yttrium chloride, yttrium nitrate, yttrium sulfate, samarium acetate, samarium chloride, samarium bromide, samarium sulfate, neodymium chloride, neodymium oxide, neodymium sulfide, neodymium sulfate, praseodymium chloride, praseodymium bromide, praseodymium sulfate, praseodymium sulfide, etc.

The base exchange steps of the process of this invention are carried out by conventional techniques. In general, the zeolite to be exchanged is contacted with a liquid medium containing the exchangeable cations dissolved therein. The zeolite undergoes rapid exchange, but prolonged contact is normally advantageous for efficient operation. The speed of the base exchange is largely dependent upon the solution temperature, the higher solution temperatures providing a more rapid exchange. Solution temperatures within the range of from 60 to 220° F. are preferred. At these temperatures, contact of the zeolite with the exchange solution for greater than about 0.1 hour is usually sufficient. Longer contact times can be employed but the effective exchange obtained diminishes with the time of contact.

The liquid medium can be any liquid in which the exchangeable cation is soluble and which does not destroy the zeolite being exchanged. Polar liquids are generally preferred such as alcohols and water, for example. Water is the liquid generally employed in commercial base exchange processes, and the following descriptions will relate to base exchange in aqueous solutions. However, it should be realized that other liquids are also operable in the process of this invention as the exchange media.

The concentration of exchangeable cations which can be employed in the exchange solution can vary widely, depending upon the cation to be replaced in the zeolite and the cation to be substituted therefor. In general, when the cation to be substituted has less affinity for the zeolite than the cation to be replaced, higher cation concentration in the exchange solution must be employed. The general requirements of the exchange solution concentration is a matter well understood in the ion exchange art.

It is known that with a particular zeolite to be exchanged and with a given exchange solution, a certain limited proportion of the cation to be replaced can be actually replaced in a single exchange step. Although this limit can be varied somewhat by the solution concentration, the proportion of exchange obtained is often insufficient to provide the product desired. As a result, many successive exchange steps are commonly employed in the industry to obtain the desired degree of substitution of a particular cation or cations into the zeolite. With each step, a smaller proportion of the desired cations can be substituted into the zeolite.

By means of a process of this invention, the proportion of cations replaced in the zeolite in the subsequent exchanges can be greatly increased, providing the degree of exchange desired in two exchange steps rather than seven or more in some instances.

This highly beneficial improvement is obtained by heating the zeolite up to a temperature of above 350° F. and preferably above 500° F. but which is insufficient to change the crystal structure of the zeolite between successive cation exchange steps. In general, the higher temperatures within this range provide the greatest increase in cations exchanged in the following exchange step. The necessary heating can be obtained by any conventional technique such as a rotary furnace or simple oven. The heating can also be obtained by spray drying the zeolites in a gas medium having a temperature above 400° F. and preferably 550° F. to a final moisture content of less than 30 weight percent.

Thermally stable zeolites can be prepared by a process of this invention. Synthetic faujasites containing less than one weight percent alkali metal cations, expressed as the oxide, which have been exchanged by contact with an aqueous solution containing ammonium ions can be contacted with an aqueous solution containing stabilizing cations such as magnesium, rare earths and mixtures thereof. The alkali metal content of the synthetic faujasite is preferably less than 0.5 weight percent expressed as the oxide. Any concentration of dissolved rare earth chlorides can be present in the exchange solution since the rare earth ions are preferentially removed from the solution. However, a practical minimum concentration is 0.1 weight percent rare earth chloride since at lower concentrations, it becomes necessary to handle impractically large quantities of the exchange solution in order to introduce the desired quantity of rare earth ions into the zeolite. The thermally stable product is a superior zeolite promoter for hydrocarbon conversion catalysts.

The process of this invention is highly beneficial in reducing the number of exchange steps required to produce the desired ammonium exchanged synthetic faujasite employed in this process. The following procedure can be employed, for example. A crystalline zeolite in the alkali metal form, for example synthetic sodium faujasite, is placed in an aqueous solution containing from 1 to 20 weight percent ammonium sulfate. The solution is maintained at a temperature of from 160 to 220° F., and the contact of the zeolite with the solution is maintained for at least 0.1 hour. The zeolite is then separated from the soltuion and is heated up to a temperature above 350° F. but which is insufficient to change the crystal structure of the zeolite. The maximum allowable temperature is dependent upon the amount of alkali metal remaining in the zeolite after the exchange, i.e., the lower the alkali metal content of the zeolite, the higher the heating temperature which can be employed without damaging the crystal structure of the zeolite. After this heating step the faujasite may be contacted with a solution containing from 1 to 20 weight percent of an ammonium salt and having a temperature within the range of from about 160 to 220° F. for at least 0.1 hour whereby ammonium ions are substituted for a portion of the exchangeable cations in the faujasite. The solutions containing the ammonium ions may contain stabilizing cations selected from the group consisting of magnesium, rare earths, and mixtures thereof whereby a portion of the stabilizing ions are introduced into the faujasite.

Other aspects of the process of this invention are illustrated by the following specific, but non-limiting examples.

Example 1

This example illustrates the normal difficulty encountered in the removal of sodium from synthetic faujasite by usual ion-exchange techniques.

A 300 g. sample of wet synthetic faujasite (about 150 g. dry basis) was treated with 1000 g. of an aqueous 3% by weight ammonium sulfate solution at 90° C. for 15 minutes. The faujasite was then separated from the solution and analyzed for sodium as $Na_2O$. The faujasite was then returned to a fresh aqueous solution of 3 percent ammonium sulfate and treated as before. This process was repeated for a total of ten exchanges. The $Na_2O$ content after each exchange is shown in Table A. It can be readily seen that the sodium content is reduced to about 3 weight percent with the 3 percent solution but can be reduced to lower levels only with great difficulty.

TABLE A

| No. of exchanges: | $Na_2O$ content of zeolite, wt. percent |
| --- | --- |
| 0 | 11.3 |
| 1 | 6.4 |
| 2 | 4.8 |
| 3 | 4.3 |
| 4 | 4.0 |
| 5 | 3.8 |
| 6 | 3.4 |
| 7 | 3.2 |
| 8 | 3.3 |
| 9 | 3.2 |
| 10 | 3.0 |

Example 2

This example shows the unobvious increases in exchange efficiency obtained with the process of this invention.

A 50 g. sample of wet synthetic faujasite (about 25 g. dry basis) was contacted with 800 ml. of an aqeuous 5 weight percent ammonium sulfate solution at 100° C. for 15 minutes. This step was then repeated with a fresh ammonium sulfate solution. The sample was washed free of sulfate ions and was then divided into two portions, Sample A and Sample B. Sample A was heated to 1000° F. for one hour. Sample B was not heated. Each of the samples was then subjected to a third exchange step as described above, and the samples were analyzed for sodium as $Na_2O$. The results are shown in Table B.

TABLE B

| Sample | $Na_2O$ content, weight percent | |
| --- | --- | --- |
| | After second exchange | After third exchange |
| A | 2.8 | 0.6 |
| B | 2.8 | 1.9 |

The remarkably improved sodium cation replacement obtained by the process of this invention can be seen from the much lower sodium content of Sample A after the third exchange. The differences between the sodium contents of Sample B and the sample of Example 1 are due to the use of a more concentrated ammonium sulfate solution in this example. With a 5 percent ammonium sulfate solution, the sodium content tends to level out at about 1.8 percent without the heating step characteristic of the process of this invention.

Example 3

This example shows the utility of the process of this invention in removing sodium cations from chabazite by ion exchange.

A 50 g. sample of natural chabazite was exchanged in 800 ml. of an aqueous 5 weight percent ammonium sulfate solution in two steps by the procedure as described in Example 2. The zeolite was then washed free of sulfate ions, divided into two parts, Samples A and B, and Sample A was heated to 1000° F. for one hour. The two samples were then contacted a third time with an ammonium sulfate solution as described above. The samples were analyzed for sodium as $Na_2O$, and the results are shown in Table C.

TABLE C

| Sample | $Na_2O$ content, weight percent | |
|---|---|---|
| | After second exchange | After third exchange |
| A | 0.11 | 0.04 |
| B | 0.11 | 0.08 |

As can be seen, the sodium content of Sample B was twice that of Sample A, showing the utility of the process of this invention for exchanging zeolites other than faujasites.

*Example 4*

This example illustrates the unique advantages obtained with the process of this invention using magnesium ions in the exchange solution.

A 50 g. sample of wet synthetic faujasite (about 25 g. dry basis) was contacted with 800 ml. of an aqueous 5 weight percent magnesium sulfate solution at 100° F. for 15 minutes. This step was repeated with a fresh magnesium sulfate solution and the sample was washed free of sulfate ions. The sample was divided into two portions, Samples A and B, and Sample A was heated to 1000° F. for one hour. Each of the samples was then subjected to a third exchange step as described above, and the samples were analyzed for sodium as $Na_2O$. The results are shown in Table D.

TABLE D

| Sample | $Na_2O$ content, weight percent | |
|---|---|---|
| | After second exchange | After third exchange |
| A | 3.03 | 2.01 |
| B | 3.03 | 2.97 |

As shown in Table D, a substantial sodium exchange with magnesium ions took place in the third exchange. In contrast, the sodium content of Sample B was hardly changed in the third exchange.

*Example 5*

This example shows the process of this invention for producing a thermally stable faujasite.

The synthetic faujasite employed in this example had the following chemical composition on a dry basis, expressed in terms of mole ratios of oxides:

$$Na_2O:Al_2O_3.5SiO_2$$

A 4 pound sample of this synthetic faujasite was contacted with a solution containing 8 pounds of ammonium sulfate in 24 pounds of water for one hour at 90° C. The exchange was repeated with a fresh solution as described above, and was washed free of sulfate ions. The sample was then heated to 1000° F. for 3 hours. The sodium content of the zeolite at this point was 2.94 weight percent $Na_2O$. The ammonium sulfate exchange was then repeated 3 more times as above. The zeolite was washed free of sulfate ions as above. The sodium content of the zeolite at this point was less than 0.5 weight percent $Na_2O$.

The zeolite was then contacted with the rare earth chloride solution previously described containing 3 pounds of rare earth chloride in 50 pounds of water at 100° F. for 15 minutes. The zeolite was then washed free of chloride ions, and was tested for sodium and rare earth contents and thermal stability. The sodium content was 0.42 weight percent $Na_2O$, and the rare earth content, expressed as $Re_2O_3$ was 13.47 weight percent. The thermal stability of the zeolite was determined by heating individual samples for 2 hours, each sample being heated at a different temperature, and measuring the surface area of the products. The results are shown in Table E.

TABLE E

Treatment—Heating
temperature, ° F.            Surface area, m.²/g.
   1500 _____ 815
   1650 _____ 715
   1700 _____ 308
   1725 _____ 329

A portion of the product was steamed at 1525° F. for 16 hours, and was found to have a surface area of 656 m.²/g. after the treatment.

As can be seen above, the product of this invention exhibits a remarkable thermal stability and therefore has a superior utility for use as a promoter in hydrocarbon conversion catalysts.

*Example 6*

This example shows the process of this invention for making a synthetic faujasite having unusual thermal stability.

The synthetic faujasite employed had a silica to alumina mole ratio of approximately 5. An ammonium cation exchanged form of this synthetic faujasite having a sodium content of 0.19 weight percent $Na_2O$ was contacted with the previously described rare earth chloride solution containing 10 g. of rare earth chloride in 500 ml. of water for 15 minutes at 100° C. The thermal stability of the product was determined by heating individual samples at different temperatures for 2 hours, and measuring the surface area of the products. The results are shown in Table F.

TABLE F

Heating temperature, ° F.          Surface area, m.²/g.
   1500 _____ 743
   1650 _____ 695
   1700 _____ 545

The product was analyzed and found to have a rare earth content of 18.6 weight percent $Re_2O_3$ (dry basis).

The unusual thermal stability of this product can be appreciated when the surface areas shown in Table F are compared with those shown in Table E. Even though the surface area of the product of this example is lower after heating at 1500° F., it is much higher than the other material after heating at 1700° F.

Obviously, many modifications and variations of the invention as herein set forth may be made without departing from the essence thereof and only such limitations should be applied as are indicated in the appended claim.

We claim:
1. A cation exchange method of producing a thermally stable synthetic crystalline faujasite containing less than one weight percent alkali metal, expressed as the oxide, which comprises:
   (a) contacting a synthetic crystalline faujasite with an aqueous solution containing ammonium cations, maintained at a temperature of from 160 to 220° F. for at least 0.1 hour,
   (b) separating the crystalline faujasite from the solution and heating it at a temperature above 350° F. but which is insufficient to cause significant changes in the crystal structure of the faujasite,
   (c) contacting the heated faujasite with an aqueous solution containing ammonium cations, maintained at a temperature of from 160 to 220° F. for at least

0.1 hour whereby a crystalline faujasite containing ammonium ions and containing less than one weight percent alkali metal, expressed as the oxide, is formed, and (d) recovering the faujasite of step (c) and contacting the so recovered faujasite with an aqueous solution containing exchangeable stabilizing cations selected from the group consisting of magnesium, rare earths, and mixtures thereof, whereby a thermally stable faujasite is formed by ion exchange replacement of ammonium ions with stabilizing cations.

References Cited

UNITED STATES PATENTS

| 3,130,006 | 4/1964 | Rabo et al. | 23—110 |
| 3,140,252 | 7/1964 | Frilette et al. | 252—455 X |
| 3,236,761 | 2/1966 | Rabo et al. | 208—111 |
| 3,293,192 | 12/1966 | Maher et al. | 23—111 X |

EDWARD J. MEROS, *Primary Examiner.*